3,516,859
METHOD OF PRODUCING INSULATED
ELECTRICAL CONDUCTOR
Heinz Gerland and Werner Gotze, Berlin, Germany, assignors to Siemens Aktiengesellschaft, Munich, Germany, a corporation of Germany
Filed Sept. 12, 1967, Ser. No. 667,204
Claims priority, application Germany, Sept. 13, 1966,
S 105,822
Int. Cl. B44d 1/14; H01b 3/30; B32b 15/08
U.S. Cl. 117—218                                3 Claims

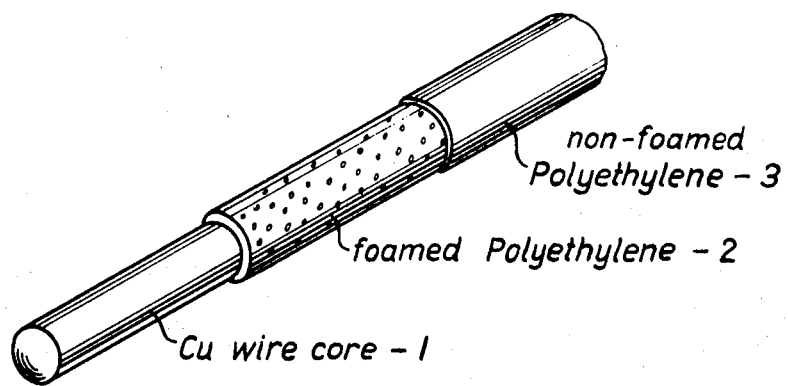

ABSTRACT OF THE DISCLOSURE

Insulated electrical conductor includes a central core of electrically conductive material, a coating of sintered foamed pulverulent thermoplastic material surrounding the core, and a coating of sintered non-foamed pulverulent thermoplastic material surrounding the first-mentioned coating.

Method of producing the insulated electrical conductor includes coating a conductor with a foamed liquid dispersion of pulverulent thermoplastic material, heating the coating to temperature at which the dispersing liquid evaporates and the remaining foamed pulverulent thermoplastic material coating the conductor is sintered, coating in turn the coating of sintered foamed material with a non-foamed liquid dispersion of the pulverulent thermoplastic material and heating the coating of non-foamed material to temperature at which the dispersing liquid evaporates and the remaining non-foamed material is sintered.

---

Our invention relates to insulated electrical conductor and method of producing the same and more particularly, the method relates to the insulation of thin electrical conductors. In application Ser. No. 392,775, filed Aug. 28, 1964, now U.S. Pat. No. 3,471,327, of which we are joint applicants with W. Jaeschke, we described a process for insulating thin electrical conductors, especially thin copper conductors, such as are employed, for example, as communication cable cores in local exchange networks, with synthetic thermoplastic materials, preferably polyolefins, by passing the conductors through a thixotropic dispersion of the thermoplastic material in pulverulent form, the viscosity of the dispersion being reduced by the action of mechanical means at the location at which the conductor passes out of the dispersion. The thus-coated conductor is then passed through one or more zones of a heated furnace wherein the liquid dispersion medium is evaporated and the remaining pulverulent thermoplastic material on the conductor is sintered and blends into a homogeneous coherent coating. This insulating method of the aforementioned copending application is suited particularly for surrounding or covering electrical conductors with a thin, but nevertheless concentrical or coaxial coating of polyethylene. This method of the copending application has an advantage over the previously known method of insulating conductors with polyethylene, which employs heated solutions, in that the high cost of expensive solvents and the difficulties of removing the vapors produced during the processing are avoided. Furthermore, the thixotropic dispersions employed in this method of the copending application have a good storage stability and can be produced at ordinary room temperature.

For example, with the method of the aforementioned copending application, thin coaxial insulating layers or coatings can be applied on thin conductors such as copper wires having a thickness of 0.3 mm., and are capable of being concentrically or coaxially produced with such narrow wall thickness by screw presses or extrusion means only at great expense.

As has already been suggested in the copending application, foamed coatings of thermoplastic synthetic material can be applied on electrical conductors by the addition of known foaming agents to the liquid dispersion of thixotropic structure. It has been found, however, in practice, that foamed coatings produced by this method of the copending application are porous and rough on the outer surface thereof.

It is accordingly an object of our invention to provide an insulation, for example, of thin local cable cores having electrical characteristic values corresponding to those of a foamed insulation while simultaneously producing a smooth outer surface of the tubular coating such as is produced by the method of the aforementioned copending application.

With the foregoing and other objects in view, we accordingly provide a method of producing insulations of foamed synthetic material, and more particularly of foamed polyethylene in two passes or operations. In accordance with the invention, insulation of foamed synthetic material, especially foamed polyethylene, is coated on the conductor in one pass or operation, and in a second pass or operation, an enclosing or superimposed insulating coating of non-foamed synthetic material, particularly non-foamed polyethylene, is coated in turn on the coating of foamed material.

Particularly favorable results have been obtained when the thickness of a superimposed non-foamed insulating coating is about one-third to one-fifth the entire wall thickness of the insulation.

As aforementioned, the method can be carried out in two operations, but it is especially economical, however, to provide suitable apparatus for carrying out the method in a single and continuous pass or operation.

The method of this invention, which corresponds in many details to the method disclosed in the aforementioned copending application, comprises passing a conductor such as a copper wire unwinding from a reel through a cleaning bath and subsequently through an annealing device having an internal temperature of about 500° C. and a reducing or inert atmosphere, so as to thereby successively clean and soften the wire material. The conductor is then passed through a vessel containing a foamed liquid dispersion of pulverulent thermoplastic material such as a foamed thixotropic polyethylene dispersion having a foaming agent in a quantity of about 0.5 to 3% by weight of, for example, diazoaminobenzol, diphenyleneoxide - 4,4' - disulfohydrazide or benzolsulfohydrazide added to the following composition:

| | Percent |
|---|---|
| Polyethylene powder (stabilized) having a median grain size of 20µ | 40 |
| Water | 36.5 |
| Methyl alcohol | 15 |
| Nonylphenolpolyglycol ether | 1 |
| Hydrate cellulose | 2.5 |
| Isopropyl alcohol | 5 |

As the conductor passes out of the vessel containing the dispersion, a mechanical stirrer, in the manner disclosed in the aforementioned copending application, stirs the dispersion so as to reduce the viscosity thereof at the location at which the conductor passes out of the vessel. The conductor covered with foamed thermoplastic material then is passed through a furnace having several heating zones in which successively the dispersing medium of the thermoplastic dispersion is evaporated, the remaining powder which is dried on the conductor is sintered, and is then fused to form a coherent, though somewhat porous and rough coating on the conductor.

In the first form of the method of our invention wherein the method is executed in two passes or operations, the thus-coated conductor can then be wound on another reel until the entire starting reel of the wire has been similarly processed in this first operation. Thereafter, the wire coated with the foamed material is then passed from the second reel in a second operation through a vessel containing much the same composition of the polyethylene dispersion but without the foaming agent therein, and then passed, after the viscosity of the dispersion has been suitably reduced by mechanical stirring at the outlet of the wire from the vessel containing the non-foamed material, through either the same furnace or a second furnace where, again, the dispersing medium of the non-foamed polyethylene dispersion is evaporated and the resultant powder sintered and fused so as to form a coherent coating of polyethylene which, however, has a smooth surface, superimposed upon the rough foamed coating surrounding the conductor, whereafter the insulated conductor is wound on a final take-up reel.

In a second form of our invention, instead of winding the conductor on a reel immediately after it passes through the furnace for the first time, it is passed instead directly through the vessel containing the non-foamed material and thereafter either through the same furnace or another furnace and then finally wound on the take-up reel.

In this second form of our invention, however, due to the requirement that the through-put speed of the wire be uniform throughout the entire process, the temperatures in the furnace zones must be suitably adjusted to correspond to the drawing speed of the conductor after it emerges from the vessels containing the respective foamed and non-foamed dispersions. Similarly, the rate at which the mechanical stirring device is operated so as to reduce the viscosity at the outlet location of the conductor from the respective dispersion vessels, must be adjusted to the through-put speed of the wire. Thus, if insulation of foamed polyethylene, for example, which is to be covered by a thin insulating layer of non-foamed polyethylene, is to be applied on the conductor, the mechanical stirring device which reduces the viscosity in the vessel containing the dispersion of foamed polyethylene, must stir at a slower rate than the corresponding stirring device located in the vessel containing the dispersion with non-foamed material.

As disclosed in the aforementioned copending application, for pulling or through-put speed of 10 meters per minute, the conductor covered with the final non-foamed layer of polyethylene is passed through a furnace about six meters in length having successive temperature zones of 210°, 240°, and 260° C. The furnace may also be suitably subdivided so as to have successive zones of slightly different temperatures to effect corresponding vaporization of the dispersing medium, sintering and fusing of the remaining foamed polyethylene coating when the wire is initially passed through the furnace or, as aforementioned, a second furnace having the required heating zones may be used. The successive temperature zones for the foamed material coating on the conductor at the aforementioned pulling speed of 10 meters per minute and for a length of traverse of 6 meters through the furnace are as follows: 180°, 210°, and 230° C.

Whereas a conductor having a coating of insulation that is 150μ thick consisting of foamed polyethylene and made in accordance with the method outlined in the aforementioned copending application, that is without a second layer of non-foamed polyethylene, exhibits a disruptive strength of 500 volts in a water bath, a conductor provided with an insulated coating of foamed polyethylene having a thickness of 110μ and a superimposed insulating layer of non-foamed polyethylene having a thickness of 40μ, has a disruptive strength in a water bath of up to 1000 volts.

Other features which are considered as characteristic for the invention are set forth in the appended claims.

Although the invention is illustrated and described herein as insulated electrical conductor and method of producing the same, it is nevertheless not intended to be limited to the details shown, since various modifications and structural changes may be made therein without departing from the spirit of the invention.

The specific construction of the insulated electrical conductor will be best understood from the following description of an embodiment thereof when read in connection with the accompanying single figure of the drawings showing in perspective view a copper wire core 1, a foamed polyethylene layer 2 of 110μ thickness coating the copper core 1, and a coating of non-foamed polyethylene 3 having a thickness of 40μ superimposed in turn on the foamed polyethylene coating.

We claim:

1. Method of insulating copper wires and other electric conductors with a covering of polyolefin, which comprises the steps of passing a conductor through a foamed aqueous dispersion of thixotropic structure containing solid polyolefin in pulverulent condition, mechanically reducing the viscosity of the thixotropic foamed dispersion, by means additional to the movement of the conductor, at a locality where the conductor emerges from the dispersion, passing the conductor covered with foamed dispersion through heated furnace zones and therein evaporating the foamed dispersion medium and sintering the foamed pulverulent polyolefin on the conductor, passing the thus-coated conductor through a non-foamed aqueous dispersion of thixotropic structure containing solid polyolefin in pulverulent condition, mechanically reducing the viscosity of the thixotropic non-foamed dispersion, by means additional to the movement of the coated conductor, at a locality where the coated conductor emerges from the non-foamed dispersion, and passing the conductor now covered with successive coatings of foamed pulverulent polyolefin and non-foamed thixotropic dispersion containing pulverulent polyolefin through heated furnace zones and therein evaporating the non-foamed dispersion medium and sintering the non-foamed pulverulent polyolefin.

2. Method according to claim 1 wherein the successive coating of the conductor with foamed thixotropic dispersion, heating the foamed thixotropic dispersion to form a sintered coating of foamed pulverulent polyolefin, coating the sintered coating of foamed pulverulent polyolefin, coating the sintered coating of foamed pulverulent polyolefin with non-foamed thixotropic dispersion and heating the non-foamed thixotropic dispersion to form a sintered coating of non-foamed pulverulent polyolefin are carried out in a single progressive pass of the conductor.

3. Method according to claim 1, wherein the successive coating of the conductor with foamed thixotropic dispersion and the heating thereof to form a sintered coating of foamed pulverulent polyolefin is effected in a first pass of the conductor, and the successive coating of the foamed polyolefin-coated conductor with non-foamed thixotropic dispersion and the heating thereof to form a sintered coating of non-foamed pulverulent polyolefin are effected in a second pass of the conductor.

References Cited

UNITED STATES PATENTS

| | | | |
|---|---|---|---|
| 2,518,454 | 8/1950 | Elliott | 117—218 |
| 3,040,278 | 6/1962 | Griemsmann | 174—110.8 X |
| 3,073,790 | 1/1963 | Bosoni. | |
| 3,219,752 | 11/1965 | Harris | 174—117 |

FOREIGN PATENTS

| | | |
|---|---|---|
| 638,002 | 3/1962 | Canada. |
| 1,001,397 | 8/1965 | Great Britain. |

WILLIAM D. MARTIN, Primary Examiner

R. HUSACK, Assistant Examiner

U.S. Cl. X.R.

117—115, 119.6, 128.4, 161, 232; 174—110